(No Model.)

O. KLATTE.
ROLL FOR CHAIN OR BAR ROLLING MILLS.

No. 534,110. Patented Feb. 12, 1895.

Witnesses:-
N. E. Bowen
W. C. Pinckney

Inventor:-
Otto Klatte
By J. E. W. Bowen
Atty.

UNITED STATES PATENT OFFICE.

OTTO KLATTE, OF NEUWIED, GERMANY.

ROLL FOR CHAIN OR BAR ROLLING MILLS.

SPECIFICATION forming part of Letters Patent No. 534,110, dated February 12, 1895.

Application filed July 10, 1894. Serial No. 517,122. (No model.)

*To all whom it may concern:*

Be it known that I, OTTO KLATTE, a subject of the King of Prussia, German Emperor, residing at Neuwied-on-the-Rhine, Germany, have invented certain new and useful Improvements in Rolls for Chain or Bar Rolling Mills, of which the following is a specification.

The present invention relates to rolls for chain or bar rolling mills, such as are described in my application for Letters Patent, filed on the 12th day of April, 1894, Serial No. 507,266.

In the application referred to a roll is described consisting of a central core disk to which a tire like ring is secured by means of two lateral disks.

The object of the present invention is to avoid the necessity of removing entirely the whole ring aforesaid when parts of the same have become defective, and this object is attained by dividing the tire like ring into a number of segments, which are then suitably attached to the rim of the said core disk and secured therein.

Figure 1:
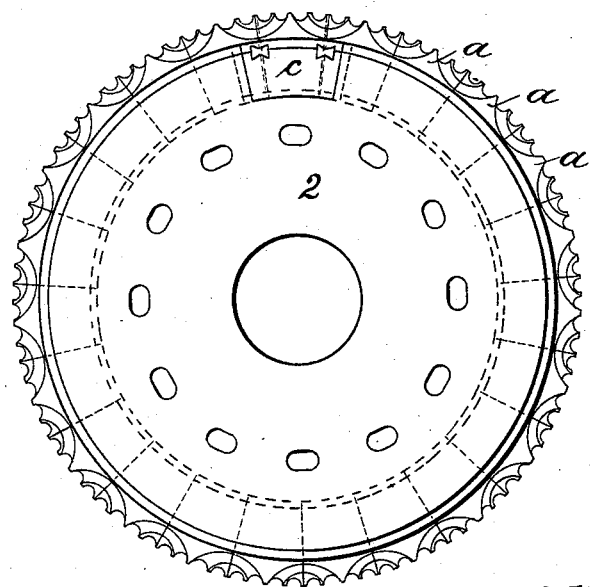
Figure 2:
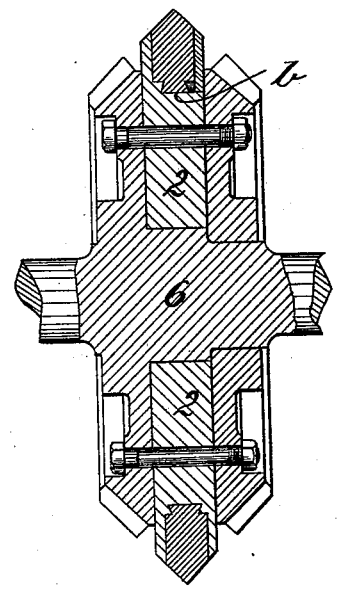
Figure 3:
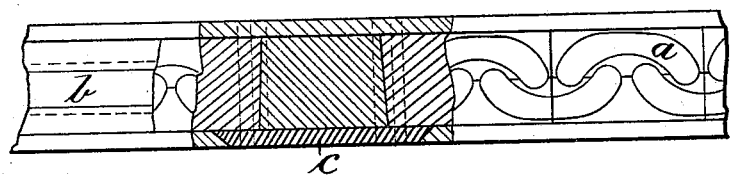
Figure 4:
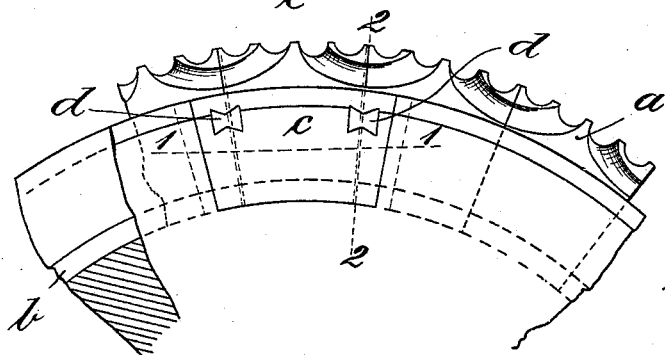
Figure 5:
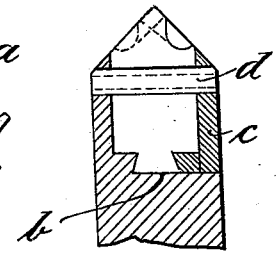

In order to render the present specification more easily intelligible reference is had to the accompanying drawings, in which similar letters and figures denote similar parts throughout the several views, Figure 1 being a side elevation of a roll constructed according to the present invention; Fig. 2, a vertical section through the center of the roll; Fig. 3, a part plan of Fig. 1 drawn to an enlarged scale, and partly in section on line 1—1 in Fig. 4; Fig. 4, a part side elevation to an enlarged scale of the roll, showing the securing cotters for the closing segment of the tire, and Fig. 5, a vertical section on the line 2—2 of Fig. 4.

Referring to Figs. 1 and 2: 2 is the core disk arranged on the shaft 6 as in the application for Letters Patent referred to in the introduction of this specification, and which may also be secured in position by two lateral clamping flanges or disks. In the present case the latter disks and the core disk are considered to be united to one piece. A dovetail groove $b$ extends round the rim of the said core disk (Figs. 2, 3, 4 and 5).

$a$ $a$ in Figs. 1 and 2 are the segments into which the tire like ring is divided, said segments being provided with dovetails to fit the groove $b$ of the core disk 2 and by means of which they are secured in the said core disk. In order to enable the insertion of the segments $a$ into the groove $b$ of the core disk, a detachable closing piece $c$ (Figs. 1, 3, 4 and 5) is provided. In fixing or removing the segments in or from the rim of the core disk, the piece $c$ is taken out and the segments slid in from the side and then slipped along the groove $b$ round the rim of the disk. The last segment inserted as also the two segments next to the said last one, on both sides of it, are made to taper laterally as shown at Fig. 3. After the insertion of the last segment, the closing piece $c$ is replaced and the cotters $d$ are driven in. These cotters $d$ (Figs. 3, 4 and 5) extend through the core disk and serve not only to retain the closing piece $c$ but also to prevent the displacement of the segments on the core disks.

I claim as my invention—

1. The combination with a roll of a tire like ring arranged on a core disk and consisting of a number of segments capable of sliding along its periphery and means for attaching said segments to the core disk substantially as described.

2. The combination of a core disk having a circular dove tail groove round its rim, a series of segments to form a tire like ring round said disk capable of sliding along said groove and having dovetails to fit said groove, suitable means for the insertion of said dovetails into said groove and means to secure the segments therein substantially as described.

3. The combination of a core disk 2, having peripheral dove tail groove $b$, the segments $a$ having dovetails, a lateral opening to said groove and a closing piece $c$ to fit said opening, cotters $d$ $d$ to wedge and secure the said segments in position substantially as described.

4. The combination of a core disk 2, having peripheral dovetail groove $b$, the segments $a$ having dovetails, a lateral opening to said groove and a closing piece $c$ to fit said opening, cotters $d$ $d$ to wedge and secure the said segments in position said segments which contact with the cotters being made to taper laterally substantially as described.

5. The combination with an axle, a core disk, and two flanges to which said disk is secured by suitable clamping devices, of a tire ring, arranged on the core disk and consisting of a number of segments and means for holding said segments in contact with the core disk and independent of aforesaid clamping devices, substantially as set forth.

In testimony whereof I have signed my name to this specification in the presence of two subscribing witnesses.

OTTO KLATTE.

Witnesses:
FR. SCHROEDER,
SOPHIE NAGEL.